Figure 1:
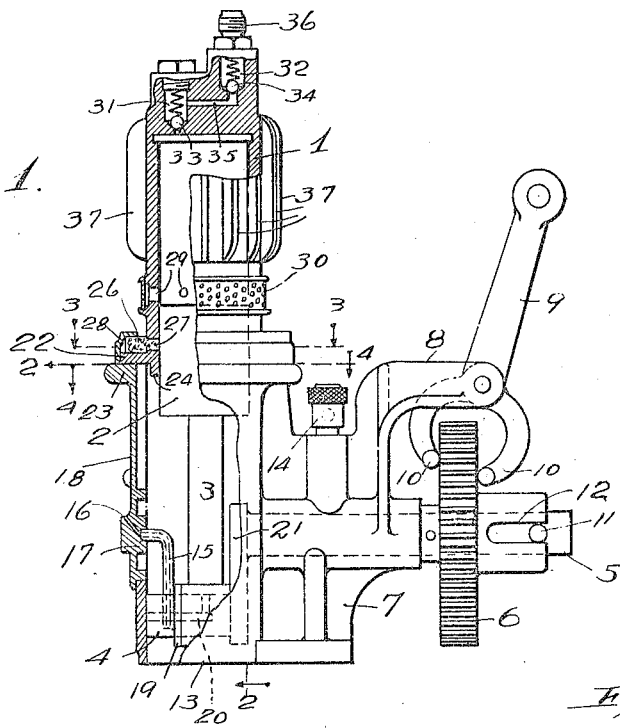

J. K. STEWART.
AIR PUMP.
APPLICATION FILED MAR. 18, 1914.

1,158,080. Patented Oct. 26, 1915.

Witnesses:

Inventor
John K. Stewart
by Burton & Burton
his attys

UNITED STATES PATENT OFFICE.

JOHN K. STEWART, OF CHICAGO, ILLINOIS, ASSIGNOR TO STEWART-WARNER SPEEDOMETER CORPORATION, OF CHICAGO, ILLINOIS, A CORPORATION OF VIRGINIA.

AIR-PUMP.

1,158,080.      Specification of Letters Patent.      Patented Oct. 26, 1915.

Application filed March 18, 1914. Serial No. 825,462.

*To all whom it may concern:*

Be it known that I, JOHN K. STEWART, a citizen of the United States, residing at Chicago, in the county of Cook and State of Illinois, have invented new and useful Improvements in Air-Pumps, of which the following is a specification, reference being had to the accompanying drawings, forming a part thereof.

This invention relates to air compressors of the sort commonly installed on automobiles for use in inflating tires and for furnishing compressed air for other purposes.

It consists particularly in certain improved means of lubrication and in features of arrangement designed to facilitate construction and assembly. These features are all described and illustrated in the drawings, being particularly set out in the appended claims.

Figure 3:
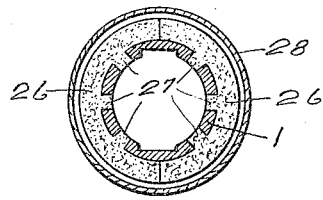
Figure 2:
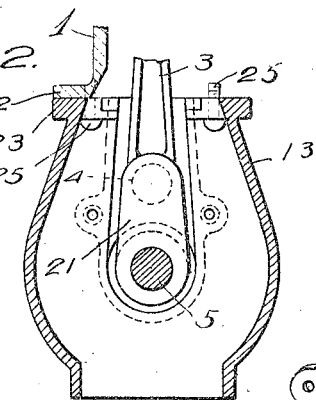
Figure 5:
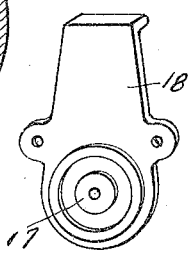
Figure 4:
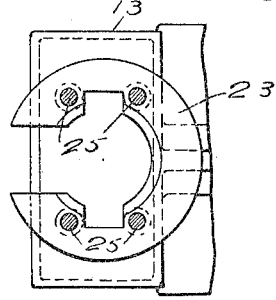

In the drawings:—Figure 1 is a side elevation of a pump embodying this invention with certain parts broken away or shown in section to disclose details of construction. Fig. 2 is a detail sectional view taken as indicated by the arrows 2—2 on Fig 1. Fig. 3 is a transverse detail section at line 3—3 on Fig. 1. Fig. 4 is a detail section taken as indicated at line 4—4 on Fig. 1. Fig. 5 is a perspective view of the crank case cover plate.

The pump shown in the drawings is of the single-cylinder type comprising essentially a cylinder, 1, provided with a snugly fitting piston, 2, which is connected by a pitman, 3, with the crank wrist, 4, of a crank shaft, 5, said shaft being provided with a slidably mounted gear, 6, adapted for operatively connecting the pump with any convenient prime mover, such as the engine or motor of a motor vehicle. The crank shaft, 5, is journaled in a frame, 7, provided with a bracket, 8, in which there is shown pivotally mounted a shifting lever, 9, whose forks, 10, 10, engage the gear, 6, for sliding it axially along the shaft, 5. Operative connection between the shaft, 5, and the gear, 6, is furnished by a cross pin, 11, in the shaft engaging a slot, 12, in the elongated hub of the gear, 6. The crank case, 13, is formed integrally with the frame portion, 7, being left open at the bottom as indicated in Fig. 2, in order that any excess of oil may be thus disposed of and not drawn into the pump cylinder so as to be expelled therefrom with the compressed air. This is particularly important when the air is used for inflation of pneumatic tires of rubber, it being well known that rubber is injuriously affected by contact with lubricating oil. The lubrication of the crank shaft bearing is effected through an oil hole provided with a common form of cap at 14, while the crank wrist is arranged to be supplied with oil through a hollow bent pin, 15, connecting with an oil hole, 16, in a boss, 17, which is formed on the cover plate, 18, of the crank case. This pin, 15, extends from the crank wrist alongside the bearing of the pitman, 3, and is accurately spaced therefrom by a washer, 19, so as to definitely position the pitman bearing on the crank wrist. Said crank wrist is provided with an oil duct, 20, communicating with the bore of the hollow pin, 15, and the bent end of said pin being coaxial with the crank shaft, 5, is journaled in the boss, 17, so as to rotate with the crank shaft as an integral part thereof and forms a continuous connection between the oil hole, 16, and the duct, 20, of the crank wrist.

The crank case, 13, being integral with the shaft bearing, 7, and not separable at any plane of the shaft axis is arranged to admit the crank shaft longitudinally through an opening in its end wall designed to be closed by the cover plate, 18; it will be understood that the crank shaft is entered with the crank arm, 21, extending upwardly as shown in Fig. 2, the pitman, 3, being then applied to the crank wrist, 4, and the pin, 15, being inserted in place, the cover plate, 18, is secured in position. The cylinder, 1, is formed with a flange, 22, which rests upon the top flange, 23, of the crank case, and the cylinder is centered in such position by means of a reduced portion, 24, fitting into a circular opening in the crank case flange. Four screws, 25, passing through holes in the crank case flange and taking into threaded openings in the flange, 22, serve to secure the cylinder in place. It will be understood that the piston, 2, is pivotally connected with the pitman, 3, by the customary wrist pin, not shown, and is inserted into the cylinder as the latter is fitted on to the crank case.

Lubrication of the piston is effected through a circular wick, preferably formed of some non-combustible material as asbestos, and made in halves, 26, 26, embracing the cylinder just above the flange, 22.

This wick is provided with projections, 27, extending into apertures in the cylinder wall so as to wipe the surface of the piston, 2, as it passes them in its working stroke. This wick may be saturated with sufficient lubricating oil to last for a considerable time, and with this method of lubrication the possibility of excessive oiling is reduced to a minimum, thus practically preventing the admixture of oil with the air expelled from the compression chamber. A flanged ring, 28, which fits tightly over the flange, 22, is provided to retain the two halves, 26, 26, of the wick in place.

The piston, 2, itself is made to control the air inlet which consists of a series of apertures, 29, formed in the piston wall just above the lowest position of the end of said piston. The downward movement of the piston creates a partial vacuum in the cylinder which is satisfied by the inrush of air as the piston passes the ports, 29, near the lower limit of its stroke, and the air thus introduced is expelled by the upward movement of the piston, 2. Preferably the ports, 29, are surrounded with a screen, 30, to exclude dust so far as possible.

In the upper end of the cylinder there are formed two valve chambers, 31 and 32, provided, respectively, with ball valves, 33 and 34, and connected by a passage, 35. These two valves are designed to supplement each other in case either one of them should for any reason fail to seat perfectly, thus insuring the pump against loss of efficiency through such cause. The chamber, 32, terminates as shown in a threaded nipple, 36, intended to receive the coupling of an air hose or pipe for conducting away the air for use. As is usual, the cylinder walls are provided with radiating fins, 37, for dissipating the heat of compression.

I claim:—

1. In a pump a piston and a cylinder in which the piston is mounted to reciprocate, the cylinder wall having at a plane transverse to the piston movement and intermediate the ends of the piston path, an aperture leading through said wall and opening into the piston path, and an absorbent oil wick extending from the exterior of the cylinder through said aperture for wiping contact with the piston.

2. In combination with a cylinder and a piston reciprocating therein, the cylinder having at a plane transverse to the path of reciprocation of the piston intermediate the ends of said path a series of apertures leading from the outside of said cylinder to the path of the piston therein, an annular oil wick of absorbent material encompassing the cylinder and having projections extending into said apertures for wiping contact with the piston, and means for retaining said annular wick in its position about the cylinder.

3. In combination with a vertically reciprocating piston and a cylinder in which it is mounted to reciprocate, said cylinder having a series of lateral apertures in its wall, an annular oil wick encircling said cylinder and having projections extending through said apertures for wiping contact with the piston.

4. In an air compressor a piston and an apertured cylinder in which it is mounted to reciprocate, an annular oil wick of absorbent non-combustible material encircling said cylinder and having a projection extending through the aperture thereof for wiping contact with the piston in its travel.

5. In combination with a vertically reciprocating piston, a cylinder in which it is mounted to reciprocate, said cylinder having a plurality of lateral apertures in its wall encircling said cylinder and a wick having projections extending through said apertures for wiping contact with the piston in its travel, and an annular retaining wall encircling said wick.

In testimony whereof I have hereunto set my hand at Chicago, Illinois, this 11th day of March, 1914.

JOHN K. STEWART.

Witnesses:
J. R. COSPER,
T. MORRIS.